Sept. 29, 1964   J. J. MANCUSI, JR   3,150,682
BALANCED PRESSURE REGULATOR
Filed July 18, 1962   3 Sheets-Sheet 1
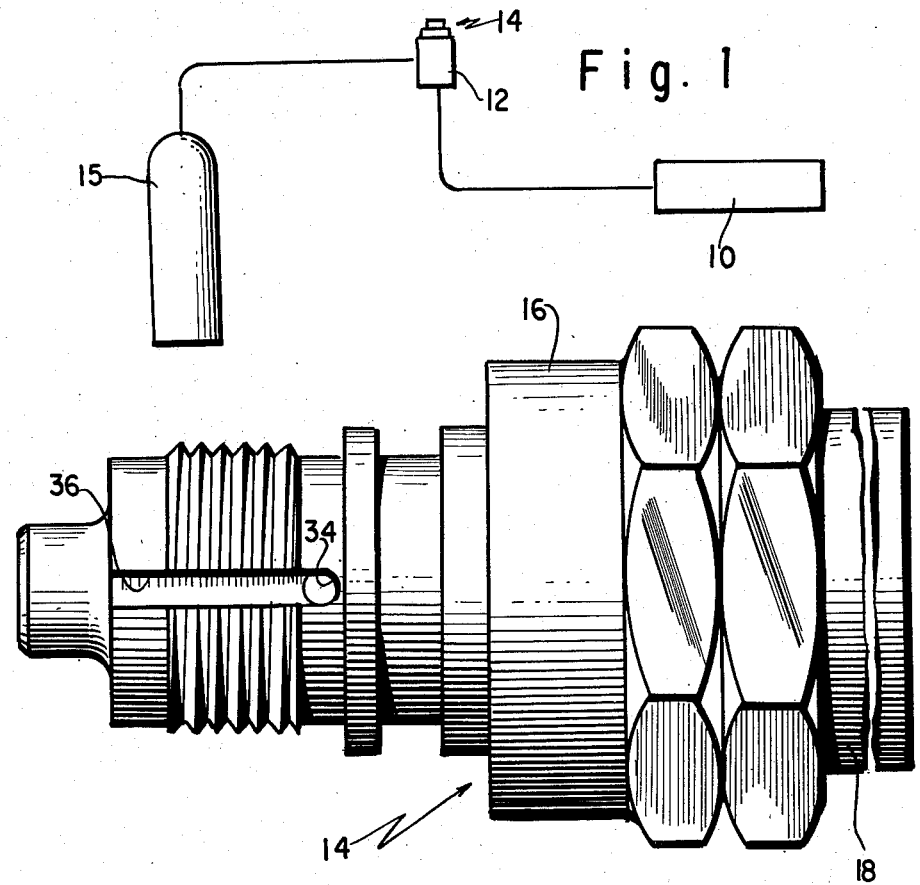
Fig. 1
Fig. 2
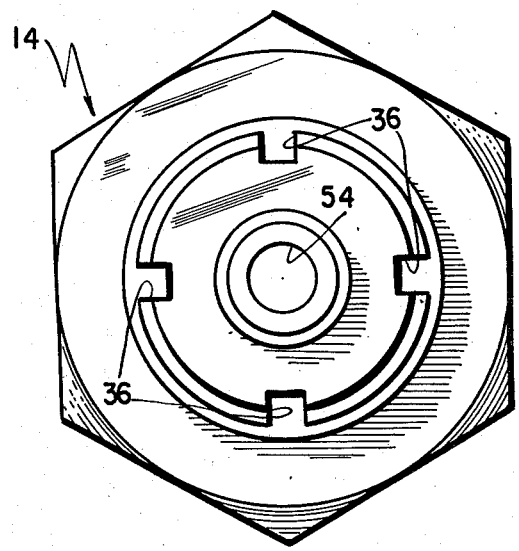
Fig. 3
INVENTOR.
JOSEPH J. MANCUSI, JR.
BY
ATTORNEY

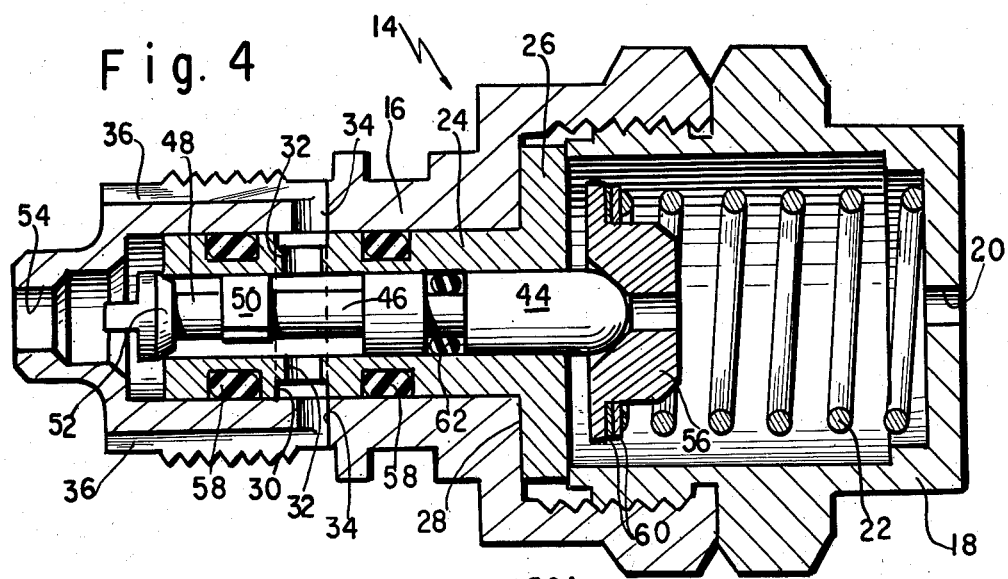
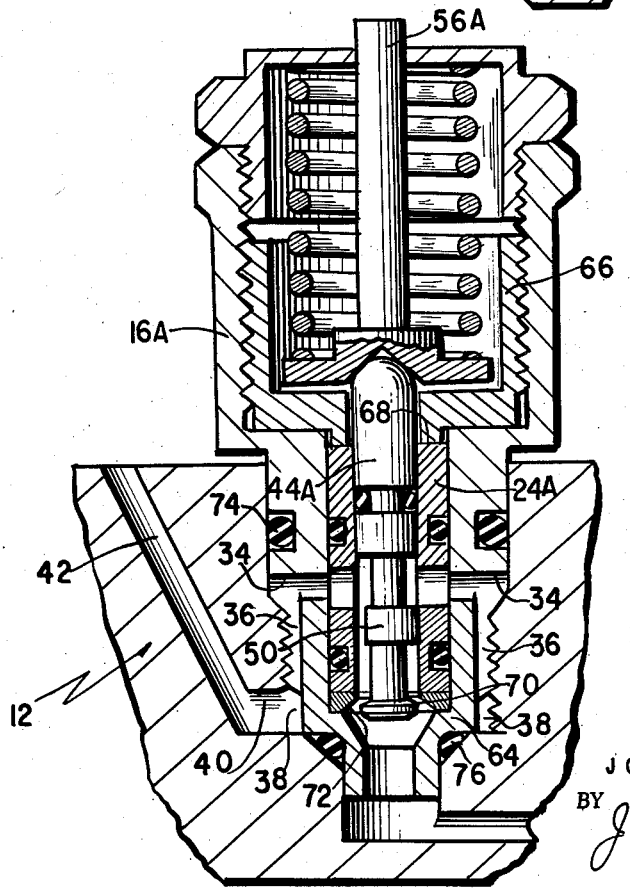

INVENTOR.
JOSEPH J. MANCUSI, JR.

United States Patent Office 3,150,682
Patented Sept. 29, 1964

3,150,682
BALANCED PRESSURE REGULATOR
Joseph J. Mancusi, Jr., Bristol, Conn., assignor to Altair, Inc., Terryville, Conn., a corporation of New York
Filed July 18, 1962, Ser. No. 210,726
6 Claims. (Cl. 137—454.5)

This invention relates to pressure regulators and particularly to pressure regulators insensitive to variations in the upstream pressure at levels above the regulating value.

According to the invention, a poppet is so arranged with respect to upstream pressure that the forces created upon the poppet by the upstream pressure cancel themselves. However, the downstream pressure acts to displace the poppet endwise towards cut off; adjustable spring pressures oppose the endwise thrust of the downstream pressure until the desired downstream pressure is reached.

The above and other objects, features, and advantages of the invention will become apparent from a reading of the following descriptions of the embodiments of the invention when considered with the accompanying drawings wherein:

FIG. 1 is a schematic of a system employing a pressure regulator according to the invention;

FIG. 2 is an exterior view of a pressure regulator according to the invention;

FIG. 3 is a left-hand end view of the regulator of FIG. 2;

FIG. 4 is a cross-sectional view of the regulator of FIG. 2;

FIG. 5 is an enlarged cross-sectional view of a vertically arranged, slightly modified pressure regulator mounted in a using housing;

Figure 6:
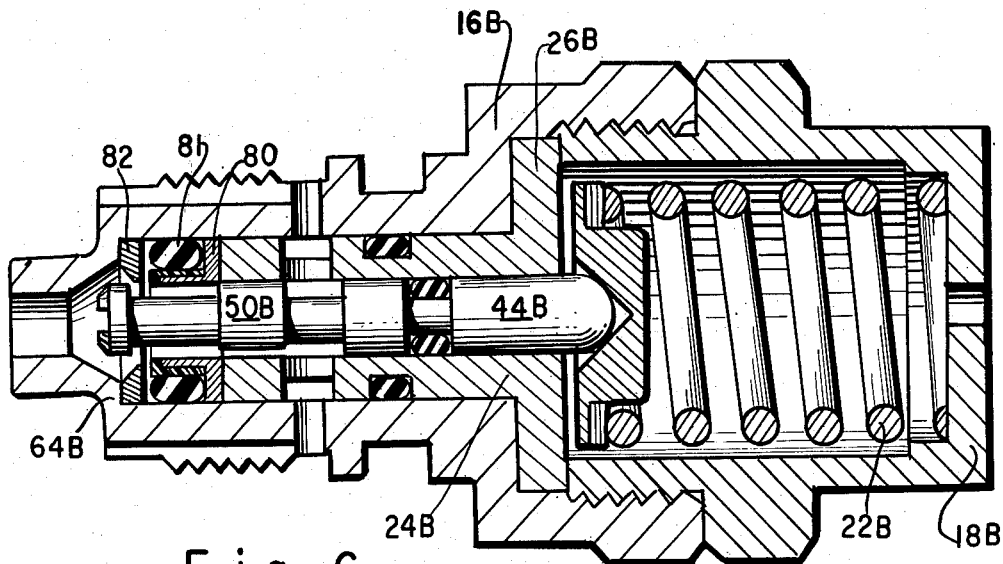
FIG. 6 is a cross-sectional view of another pressure regulator embodying the invention.

A pressure regulator is intended to provide essentially constant downstream pressure from a higher upstream pressure. As shown in FIG. 1, a using means 10 for regulated pressure may be located downstream from a housing 12 mounting a pressure regulator 14. The upstream side of the housing may be connected to a fluid supply, either gas or liquid, as in the tank 15.

Now it is well known that variations occur in the pressure of a fluid supply, and it will be evident that a fluid supply as tank 15 will decrease in pressure as it is used. It is a feature of this invention that variation in the upstream pressure will have no effect on the downstream or regulated pressure until the upstream pressure drops below the regulated value.

As seen more particularly in FIGS. 2, 3, and 4, a pressure regulator 14 includes a metal sleeve 16 having a reduced end externally threaded to mount the regulator securely in the housing 12. The other end of the sleeve 16 is enlarged and internally threaded so as to cooperate with the external threads of a spring retainer 18. The spring retainer, while generally tubular, is closed at one end, save for a vent opening 20, to form a reaction base for a compression spring 22.

In addition to mounting the spring 22, the retainer 18 also serves to secure a metal valve insert 24. To this end, the open end of the retainer abuts one face of a radial flange 26 on one end of the valve insert to hold the other face thereof against a shoulder 28 of the sleeve. The valve insert 24 is thus secured against axial displacement within the regulator. It is secured against radial displacement by being formed with an exterior cylindrical surface which fits snugly within the interior cylindrical surface of the sleeve 16.

The valve insert is generally tubular. About midway its length, its exterior surface is formed with a circumferential groove 30. Apertures 32 communicate the groove 30 with the interior of the valve insert 24. The groove, in the seated condition of the insert, is aligned with pasasges 34 extending radially through the sleeve 16. The passages 34 terminate exteriorly in the ends of longitudinal grooves 36 formed across the external threads of the sleeve 16. The other ends of the grooves 36 communicate with a circumferential groove 38 formed in the lower end of an opennig receiving the regulator 14 in the housing 12, as may be best seen in FIG. 5.

This groove communicates via a port 40 with a passageway 42 suitably connected as by tubing to the fluid supply 15.

Returning to FIG. 4, a metal poppet 44 is shown slidably disposed in the valve insert 24. The poppet, of solid material, has reduced areas 46 and 48, separated by a guide land 50. The guide land is not completely circumferential to enable fluid flow from one side to the other. It is so located as not to interfere at any time with the inflow of high pressure fluid through the apertures 32.

The left-hand end of the poppet, as seen in FIG. 4, is provided with a conical surface 52 which in the closed condition of the poppet intersects the interior edge of the valve insert 24 to effect sealing action cutting off the upstream side from the downstream side extending through the opening 54 in the left-hand end of the sleeve 16.

The right-hand end of the poppet 44 is rounded and receives a spring guide 56. The guide has a reduced portion which receives the spring 22. Shims 60 in any number may be employed to vary the effect of the spring force upon the spring retainer and hence upon the poppet 44.

In operation, high pressure fluid on the upstream side would pass along the grooves 36 to enter the pressure regulator through the passages 34 in the sleeve 16. From there, the fluid would enter the circumferential groove 30 in the valve insert 24. Leakage of the high pressure fluid to either side of the circumferential groove 30 would be prevented by O rings 58 mounted in corresponding circumferential grooves in the valve insert 24.

From the circumferential groove 30, the fluid would flow through the apertures 32 and into the interior of the valve insert 24 and about the reduced area 46 of the poppet 44. The fluid will be sealed from escape along the right-hand end of the poppet by the O ring 62 in a circumferential groove in the poppet.

High pressure fluid will flow past the guide land 50 and into the space about the reduced poppet area 48.

FIG. 4 shows the poppet 44 in a fluid cut-off position: a position which is reached only after the downstream pressure has built up to a desired value. Therefore, when fluid first enters the pressure regulator, the poppet will be in an open position. This open position is determined by the action of the spring 22 which forces the spring retainer 56 to the left until it abuts the flange 26 of the valve insert 24. Of course, the poppet 44, too, will have been left shifted to an open position.

Fluid will flow then out of the valve insert 24 past the poppet conical surface 52 and out of the sleeve opening 54 into the downstream using means. As the downstream pressure builds up, the fluid pressure within the poppet will rise and act upon the right-hand end of the poppet as if it were a piston. The poppet will then move to the right against the action of the spring 22. The poppet will reach closed position when the fluid pressure within the poppet area reaches a desired value. Fluid pressure within the poppet area will continue to build up to the pressure level of the supply; however, this higher pressure will not be communicated downstream because the conical surface 52 will be in sealing relationship with the inner edge of the valve insert 24. It should be observed that both ends of the poppet present the same effective piston area to the higher pressure building up within the poppet area so that the forces due to the fluid pressures cancel themselves out and render the position of the poppet in the closed position insensitive to variations in upstream pressure.

Once in the closed position, the force of the spring is counterbalanced by the action of the downstream pressure upon the piston-like surface of the left-hand end of the poppet. When the downstream pressure drops, the spring 22 will force the poppet to the left to admit more high pressure fluid downstream. As the desired downstream pressure is reached, the poppet will again move to closed position as above described.

The pressure regulator of FIG. 5 is of slightly modified construction. The metal valve insert 24A is not provided with a flange as in the previously discussed embodiment; instead, it is located by being seated on a shoulder 64 of the sleeve 16A and held there by a centrally apertured, hollow nut 66 threadedly secured in the enlarged end of the sleeve 16A. Flanges 68 on the nut extend to engage the valve insert 24A.

The primary difference involves the shape of the lower end of the poppet 44A and that of the lower inside edge of the valve insert 24A. The lower end of the poppet is of such size as to be snugly received within the valve insert to effect fluid cutoff. Beveled surfaces 70 and 72 on the poppet and on the valve insert, respectively, streamline fluid flow as the poppet approaches cutoff position. In other respects, the pressure regulator of FIG. 5 would operate as that of FIG. 4.

It should be observed that O ring 74 seals the pressure regulator-housing 12 joint to prevent escape to outside of the high pressure fluid. Similarly, O ring 76 also seals the pressure regulator-housing joint to prevent leakage to downstream of the high pressure upstream fluid.

Figure 7:
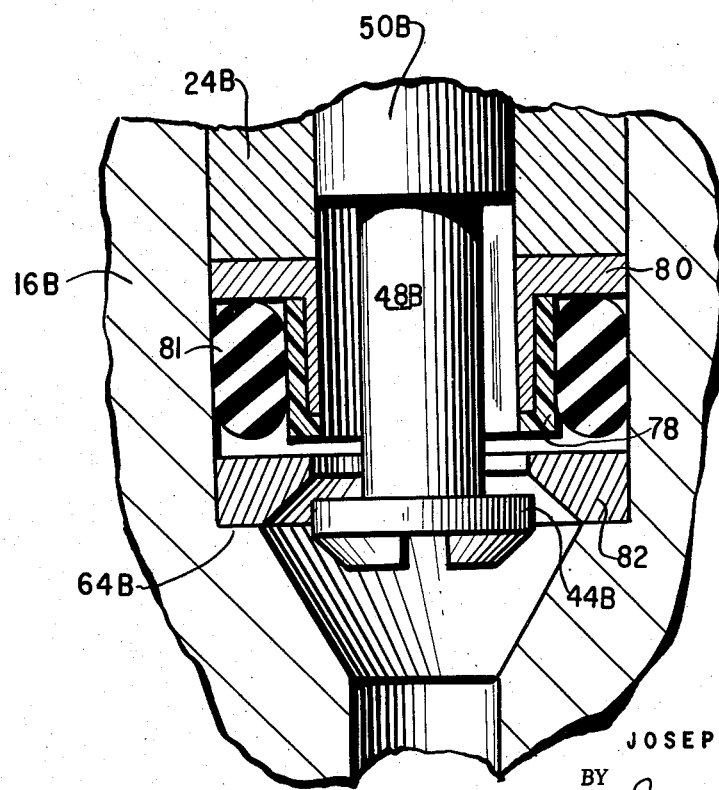
FIG. 7 is an enlarged view of a portion of FIG. 6.

FIGS. 6 and 7 show yet another embodiment of the invention. This embodiment differs from that of FIG. 4 mainly in providing a soft seated sealing arrangement instead of a metal to metal one. The lower end of the poppet 44B is a solid disc whose diameter is slightly greater than the interior diameter of the valve insert 24B. The flat upper face of the poppet disc engages the lower edge of a generally cylindrical plastic (Teflon) element 78 to effect sealing engagement. The element 78 is carried by a metal support seat 80 L-shaped in cross-section and affixed as by welding to the lower end of the valve insert 24B. An O ring 81 disposed behind the cylindrical Teflon element 78 seals valve insert-sleeve joint to isolate the upstream and downstream fluids. A metal backup 82 is affixed as by welding upon the shoulder 64B of the sleeve 16B. The backup 82 slidably accommodates the lower end of the poppet and acts to reduce fluid flow as the poppet moves to closed position, thus minimizing wear and tear on the Teflon element 78.

It will be evident then that there have been provided three different embodiments of the invention. However, each pressure regulator is characterized by being insensitive to upstream pressure above the regulating level. The poppet controlling fluid flow in each regulator is loaded by a calibrating spring and moved thereby from closed or cut-off position solely by a reduction in the downstream pressure. As the downstream pressure builds up to a desired value, the poppet restores to closed position. The desired value is simply obtained either by choice of calibrating spring or by addition or removal of shims.

It should be noted that the regulators utilize only one moving or dynamic seal on the poppet. This results in a rather freely movable poppet and hence a highly sensitive regulator even at low pressure levels because the frictional forces are minimal.

The units are designed for inlet pressures to 10,000 p.s.i. Regulated pressure levels, determined primarily by spring design, are limited at high values only by the size of springs that may be employed and at low levels by the relationship between the spring force available and the frictional forces occasioned by the dynamic seal.

What is claimed is:

1. In a pressure regulator; a sleeve having one end portion externally threaded and formed with a cylindrical bore and other end portion enlarged and internally threaded, an inlet port in said one end portion intermediate the ends of the bore, and a groove cut across the external threads to communicate a source of high pressure fluid with said inlet port; a tubular valve insert having an inlet port secured in said sleeve bore so that its inlet port communicates with the sleeve inlet port, a rod-like poppet having a reduced central portion slidably disposed in said valve insert bore so that the reduced central portion is at all times opposite the valve insert inlet port, one end of said poppet being of a diameter to be snugly received in said bore and continuously projecting from said bore though always sealing it, the other end of said poppet having a diameter at least equal to the diameter of said bore and cooperating with the other end of the valve insert to effect a fluid seal in the closed position of the poppet and to provide an outlet port therebetween in the open position of the poppet; a spring guide seated upon the extending end of the poppet; an externally threaded spring retainer screwed into the enlarged end portion of the sleeve; and a compression spring disposed between the spring guide and the spring retainer to urge the poppet inwardly from a closed to an open position.

2. In a pressure regulator according to claim 1, the outlet port end of the valve insert being formed with a sharp interior edge, and the other end of the poppet being formed with an inwardly-directed conical surface which engages the sharp edge of the valve insert to effect a fluid seal in the closed position of the poppet.

3. In a pressure regulator according to claim 1, the outlet port end of the valve insert being formed with an outwardly flared surface, and the other end of poppet being formed so as to be snugly yet slidably received with the valve insert bore and so as to have a beveled surface on its interior edge.

4. In a pressure regulator according to claim 1 the outlet port end of the valve insert terminating with a plastic element, and the other end of the poppet being formed with an enlarged disc of greater diameter than the valve insert bore, the interior face of said disc in the closed position of said poppet engaging the plastic element to effect fluid seal.

5. In a pressure regulator according to claim 4, a backup element downstream of the plastic element and slidably accommodating the poppet enlarged disc to slow down fluid flow as the poppet approaches closed position and thereby protect the plastic element.

6. In a pressure regulator according to claim 1, a circumferential groove in said one end of said poppet, and an O ring carried in said groove to effect a complete seal.

References Cited in the file of this patent

UNITED STATES PATENTS

| 427,152 | Buttz | May 6, 1890 |
| 718,694 | Chapman | Jan. 20, 1903 |
| 2,039,638 | Druge | May 5, 1936 |
| 2,920,647 | Mercier | Jan. 12, 1960 |
| 2,933,099 | Lisiak | Apr. 19, 1960 |
| 2,968,315 | Fisher | Jan. 17, 1961 |
| 3,095,897 | Pennstrom | July 2, 1963 |